March 3, 1959
G. E. NORMAN
2,875,475
METHOD OF PRODUCING A PRE-FABRICATED TILE
RECEPTOR FOR SHOWER CABINET
Filed March 12, 1957
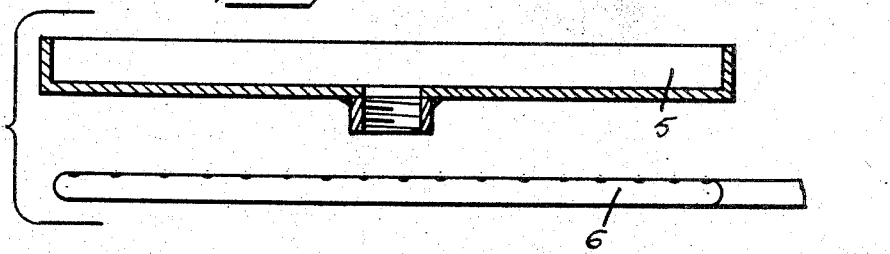
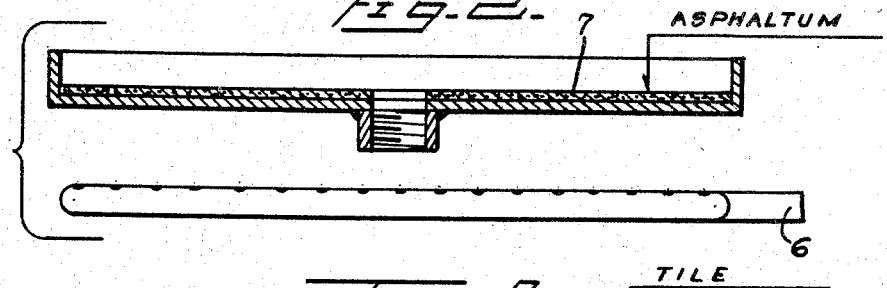
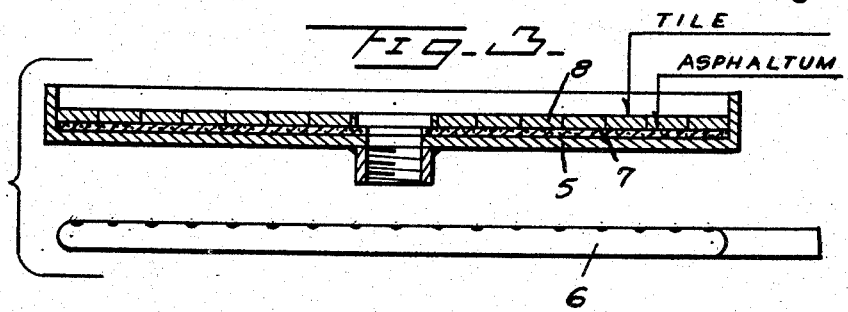
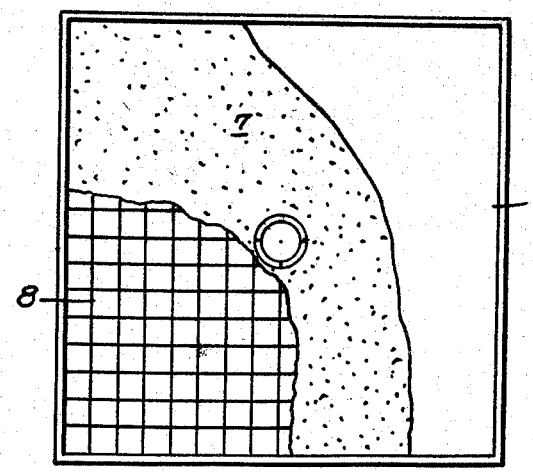
G.E.Norman
INVENTOR
BY CA Snow &Co.
ATTORNEYS.

United States Patent Office 2,875,475
Patented Mar. 3, 1959

2,875,475

METHOD OF PRODUCING A PRE-FABRICATED TILE RECEPTOR FOR SHOWER CABINET

Glenn Erwin Norman, Nevada, Mo.

Application March 12, 1957, Serial No. 645,393

1 Claim. (Cl. 18—61)

This invention relates to a method of manufacturing receptors, the primary object of the invention being to provide a method of producing receptors for shower stalls which are formed with floors embodying an asphaltum base, or adhesive plastic material.

An important object of the invention is to provide a receptor of this character wherein the surface of the floor is formed of ceramic tile of the desired ornamental design, and wherein the receptor may be constructed at a minimum cost with due consideration directed to the strength and durability of the receptor.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Figure 1 is a sectional view through a pan forming a base for the receptor, illustrating a heat applying burner disposed thereunder.

Fig. 2 is a longitudinal sectional view through the receptor pan with a layer of asphaltum covering the bottom, the pan and asphaltum illustrating the stage of cooling.

Fig. 3 is a longitudinal sectional view through the receptor pan showing the tiles as positioned on the cooled asphaltum prior to reheating the pan and asphaltum.

Fig. 4 is a plan view partially broken away illustrating the asphaltum with the tiles positioned thereon.

In carrying out the method I provide a receptor pan 5 constructed of preferably fourteen gauge galvanized sheet metal in which a thin layer of heated asphaltum 7 is poured covering the bottom of said pan. The pan with the thin layer of asphaltum is now placed over a suitable gas heater 6, subjecting the entire surface of the pan of the receptor and asphaltum to heat.

The pan is heated to a degree of temperature capable of maintaining melted asphaltum in a melted state for a considerable length of time. The receptor is now removed from the heat generating apparatus and allowed to cool. After the cooling of the asphaltum which has become solidified, the tiles 8 are positioned on the surface of the asphaltum and the tiles are arranged to produce a desired design.

The receptor together with the asphaltum and tiles, is then subjected to heat to a degree to liquify the asphaltum. The tiles are embedded by rolling or tapping the tiles until they become firmly embedded in the asphaltum base. The receptor is now removed from the heater and allowed to cool and the spaces between the tiles are filled with cement sealing off the asphaltum.

As a final step, the space around the drain opening 9 of the receptor is calked and the surface of the tiles cleaned, presenting an exceptionally attractive floor surface.

Having thus described the invention, what is claimed is:

The method of producing a precast receptor, consisting in providing a metal receptor pan, heating said pan, placing and smoothing a thin layer of asphaltum in said heated pan, allowing the pan and asphaltum to cool, placing tiles in position on the cold asphaltum in said pan with the upper surfaces of said tiles forming a predetermined design and spaced from the upper edge of said pan, reheating the asphaltum to a plastic state, applying pressure by rolling said tiles, embedding the tiles in the reheated layer of asphaltum permanently securing said tiles and said pan together, and finally filling the spaces between said tiles with cement, sealing off the asphaltum.

References Cited in the file of this patent

UNITED STATES PATENTS

| | | |
|---|---|---|
| 1,619,773 | Van Der Pyl | Mar. 1, 1927 |
| 1,640,830 | Hunt | Aug. 30, 1927 |
| 1,925,460 | Pegram | Sept. 5, 1933 |
| 2,108,226 | Johnston | Feb. 15, 1938 |
| 2,229,742 | Kauffman | Jan. 28, 1941 |